United States Patent [19]

Balfanz

[11] 4,255,643
[45] Mar. 10, 1981

[54] PROGRAMMED WELDING MACHINE WITH CONTINUOUSLY MONITORED OVERRIDE CONTROL

[75] Inventor: Fredrick J. Balfanz, Waukesha, Wis.
[73] Assignee: C-R-O, Inc., Menomonee Falls, Wis.
[21] Appl. No.: 24,696
[22] Filed: Mar. 28, 1979
[51] Int. Cl.³ .................................................. B23K 9/12
[52] U.S. Cl. .............................. 219/124.34; 219/125.1; 228/9; 228/45; 318/575; 318/593
[58] Field of Search .......... 219/125.1, 124.22, 124.34; 318/575, 576, 592, 593, 594, 567, 568, 569, 561; 228/8, 9, 45

[56] References Cited

U.S. PATENT DOCUMENTS

| | | | |
|---|---|---|---|
| 3,258,776 | 6/1966 | Boyle et al. | 318/592 |
| 3,548,172 | 12/1970 | Centner et al. | 318/561 |
| 3,850,105 | 11/1974 | Aronstein et al. | 318/592 |
| 3,924,094 | 12/1975 | Hansen et al. | 219/124.34 |
| 4,010,346 | 3/1977 | Cecil et al. | 219/124.34 |
| 4,011,437 | 3/1977 | Hohn | 318/568 |
| 4,014,495 | 3/1977 | Oda et al. | 219/125.1 |

Primary Examiner—C. C. Shaw
Attorney, Agent, or Firm—Andrus, Sceales, Starke & Sawall

[57] ABSTRACT

A welding machine includes a programming device to move a welding head relative to horizontal main X and Y axes, and to rotate the head about a vertical C axis. A sensor is connected to rotate with the welding head on a rotator. A sine cosine resolver is mounted on the rotator so that its shaft is geared to the rotator gear. Deviations from the programmed path which may occur in the weld groove are sensed by the sensor, which in turn causes the resolver output to drive a slide mechanism which defines deviation axes $X_d$ and $Y_d$ and which causes the weld head to move from its programmed path to the desired corrected path, when needed. The overriding correction is independent of the program.

12 Claims, 9 Drawing Figures

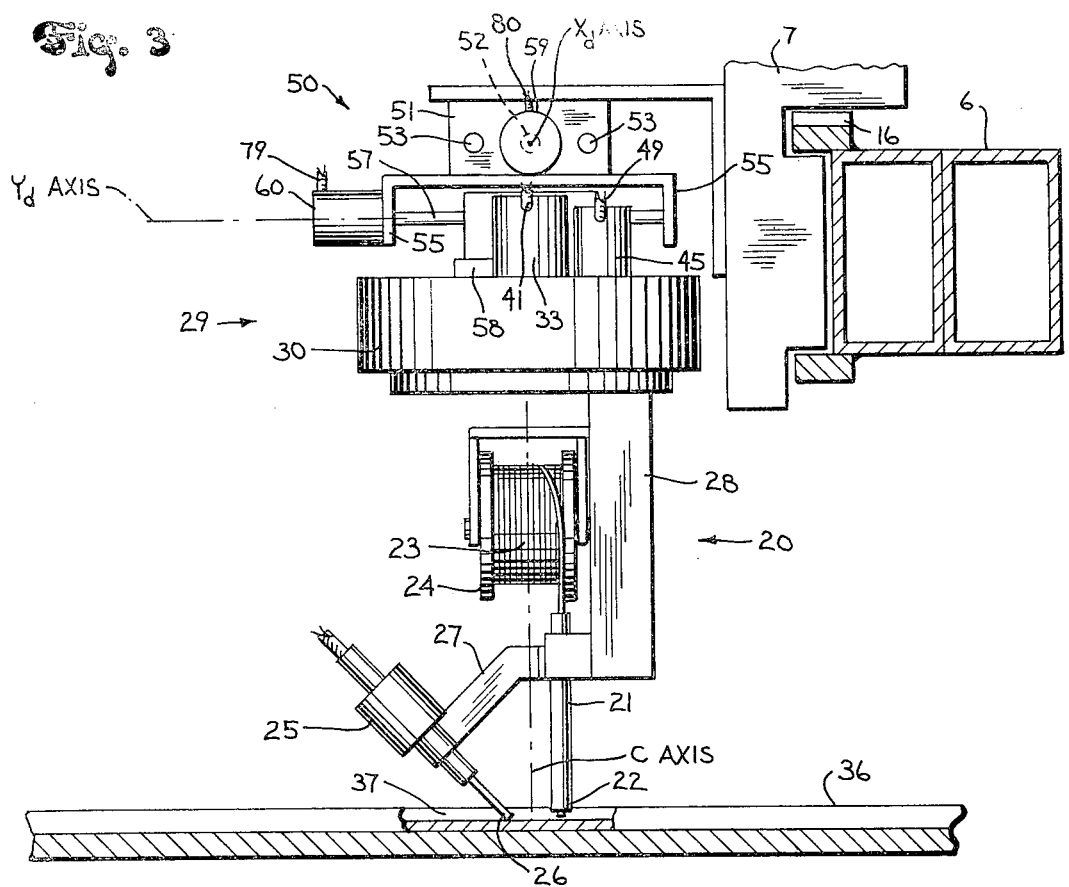
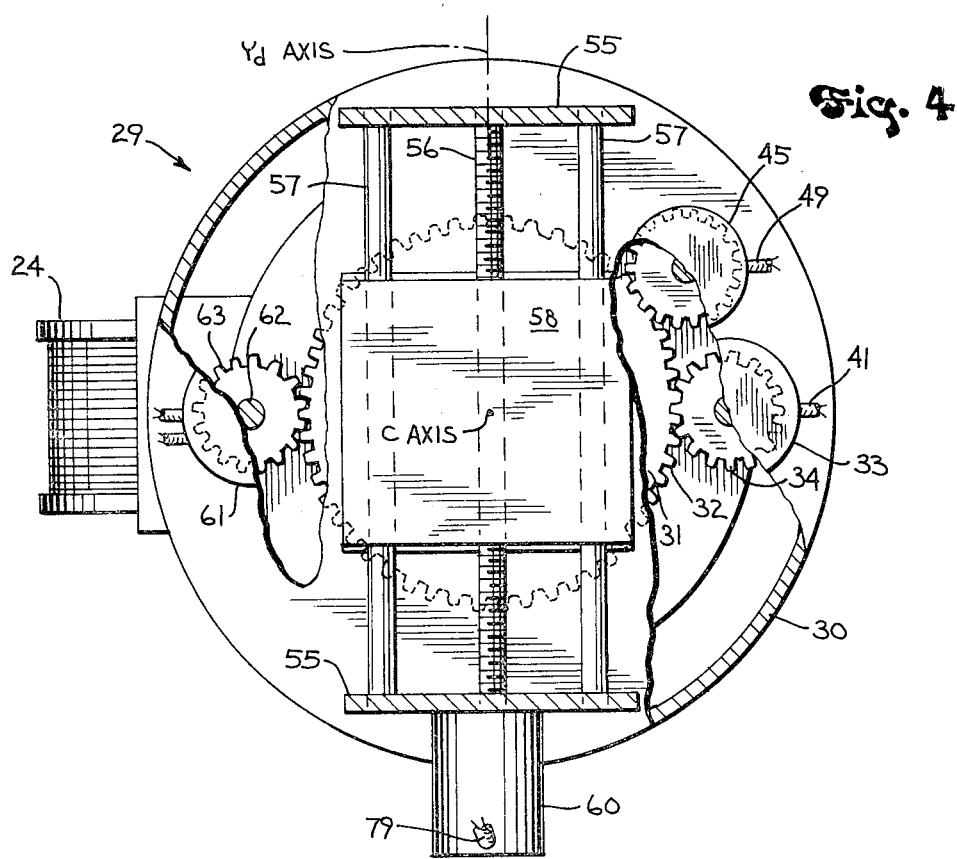

PROGRAMMED WELDING MACHINE WITH CONTINUOUSLY MONITORED OVERRIDE CONTROL

U.S. PRIOR ART OF INTEREST

U.S. Pat. No. 3,171,012; Morehead; Feb. 23, 1965
U.S. Pat. No. 3,434,212; Kleine et al; Mar. 25, 1969
U.S. Pat. No. 3,924,094; Hansen et al; Dec. 2, 1975
U.S. Pat. No. 3,997,757; Cecil et al; Dec. 14, 1976
U.S. Pat. No. 4,012,027; Hooper; Mar. 15, 1977
U.S. Pat. No. 4,014,495; Oda et al; Mar. 29, 1977

BACKGROUND AND SUMMARY OF THE INVENTION

This invention relates to a programmed welding machine with a continuously monitored override control.

Welding machines which have a programming device associated therewith for directing the welding head along a predetermined path have long been in use. The programming device may include such apparati as numerical control (N/C), templates with tracer followers and the like. The welding machines have been used to manufacture large parts such as booms, c-frames, vehicle lift arms, etc., which may include not only straight line segments but also contoured segments.

In the manufacture of large parts such as those mentioned above, they have often been formed from an assembly of two or more individual pieces which have been initially created by flame cutting them with plasma or like torches from a large workpiece. The individual pieces are then tack welded if desired and fixedly positioned adjacent each other to form a groove or seam. A welding head is then moved along the groove to apply a bead which joins the pieces together.

In addition, contouring devices are already known which include a transverse beam or bridge which defines a transverse or X axis and which is movable along rails or the like which define a longitudinal or Y axis. A carriage mounted for movement along the bridge carries a metal working tool, such as a cutting torch or the like.

Furthermore, it is known to mount a sensing means such as a probe adjacent a welding head for the purpose of sensing the position of the edge of a groove or seam for welding, and to broadly provide a slide mechanism for adjusting the position of the welding head in accordance with the positional output of the probe.

It has long been desired to provide a welding machine that is truly universal, that is, one which will accurately weld almost any desired contour without the need for major readjustments in the mechanism. Unfortunately, to the knowledge of the inventor, this has not previously been possible, even with pre-programmed controls.

One of the major problems has been that, even though almost any contour can be programmed via N/C or tracer devices, the groove to which the welding material is to be applied does not usually conform to the desired contour exactly. This non-conformity is unpredictable and may be the result of a number of actors, one of the most significant being that the edges of the pieces to be joined often cannot be originally flame cut or otherwise formed to a very close tolerance. The tolerance in flame cutting may be as much as ¼ inch or more. This large tolerance may make it difficult, if not impossible, to create a final welded seam that is structurally sound throughout its length, even with a programmed weld head contouring control. Another problem occurs because tack welding of pieces to be welded introduces heat to the parts, thereby causing distortion.

As a result of the above problems, the practice in the past has been to design a different welding machine for weldments of differing shapes and to solve the tolerance problem in the design of each particular machine.

It is a task of the present invention to provide a programmed welding machine that will accurately join large pieces along any desired contour without the need for major readjustments of the machine when welding parts of different shape.

It is a further task of the invention to provide a programmed welding machine that will automatically compensate for deviations in the contours in the weldments when welding many parts of the same general shape, or when welding parts of different shape.

It is another task of the invention to provide a programmed welding machine wherein the weld head is driven along a programmed path which corresponds to the desired general weld contour, and wherein deviations from that contour in the welding groove between the parts are compensated for to cause the weld head to be driven along the exact path dictated by the parts themselves. The said exact path is, at least at times, different from the programmed path.

It is yet a further task of the present invention to continuously compensate for the said contour deviations in a manner that does not affect or change the basic programming control, and to place the weld where in reality it should be rather than where it was programmed to be.

The invention is contemplated for use in connection with a welding machine wherein main horizontal X and Y axes are defined. A mounting device is carried beneath the carriage of the welding machine, for mounting an assembly comprising a welding head and a weld groove sensor. This mounting device comprises a rotor which defines a vertical C axis about which the tips of the welding head and sensor can be rotated.

A programming device, such as a numerical control arrangement or a tracer, is programmed in the usual manner to move the machine parts, and thus the welding head and sensor assembly, relative to the main X and Y axes, and may be used to turn the rotator so that the said assembly turns about the C axis. Programmed turning of the assembly is for the purpose of maintaining the sensor in a position ahead of the welding head along the welding groove, no matter what the contour thereof. A feedback from the main drive motors for the machine and rotator satisfies the programming device that the welding head and sensor assembly is where it is programmed to be.

Broadly, the inventive concept is deriected to overriding the programming device in a manner so that the welding head is continuously moved from the programmed path to a desired corrected path defined by deviations in the weld groove, without affecting the program.

A slide assembly is connected between the machine carriage and the welding head and sensor assembly, with the slide assembly defining a plurality of axes of deviation, such as $X_d$ and $Y_d$. The slide assembly is adapted to be driven by motors, one for each axis of deviation, to cause translation of the welding head from its programmed path to the desired deviated path in accordance with the deviaton in the weld groove.

For purposes of control of the slide motors, the shaft of a sine-cosine resolver is gearingly connected in a one-to-one relationship to a gear forming part of the rotator. The stator windings of the resolver are connected to the slide motors and are responsive to a voltage fed to the resolver rotor or shaft winding. The stator winding signal is responsive to the deviated position of the sensor in the weld groove relative to the programmed weld head position and, depending upon the amount of deviation, drives the slide motors to provide a correction in the welding head position.

The rotary position of the resolver shaft, and thus the rotor winding, relative to the stator windings, provides a settling of the resolver which determines the ratio of the relative corrective drive signals to be fed to the slide motors. The resolver shaft's rotary position is, in turn, responsive to the rotary position of the rotator, through the gearing connection.

As the welding machine is operated, the programming device drives the welding head along a straight or contoured path relative to the main X and Y axes, which is the generally desired path for forming the weld in a groove between two pieces to be joined. At the same time, the programming device may turn the rotator when necessary about the vertical C axis to maintain the sensor ahead of the welding head. Deviations from the programmed path in a direction perpendicular thereto are sensed by the sensor which, through the resolver, instructs the slide motors to move the welding head from its programmed path and along the $X_d$ and-/or $Y_d$ axes to the actual desired deviated path.

Although the welding head is caused to deviate from its programmed path when needed, the programming device is unaffected thereby and may be used to weld other identical pieces which may have different deviations.

BRIEF DESCRIPTION OF THE DRAWINGS

The accompanying drawings illustrate the best mode presently contemplated by the inventor for carrying out the invention.

In the drawings:

FIG. 3 is a vertical section taken on line 3—3 of FIG. 2;

FIG. 4 is a horizontal section taken on line 4—4 of FIG. 2;

DESCRIPTION OF THE PREFERRED EMBODIMENT

Figures 1, 2:
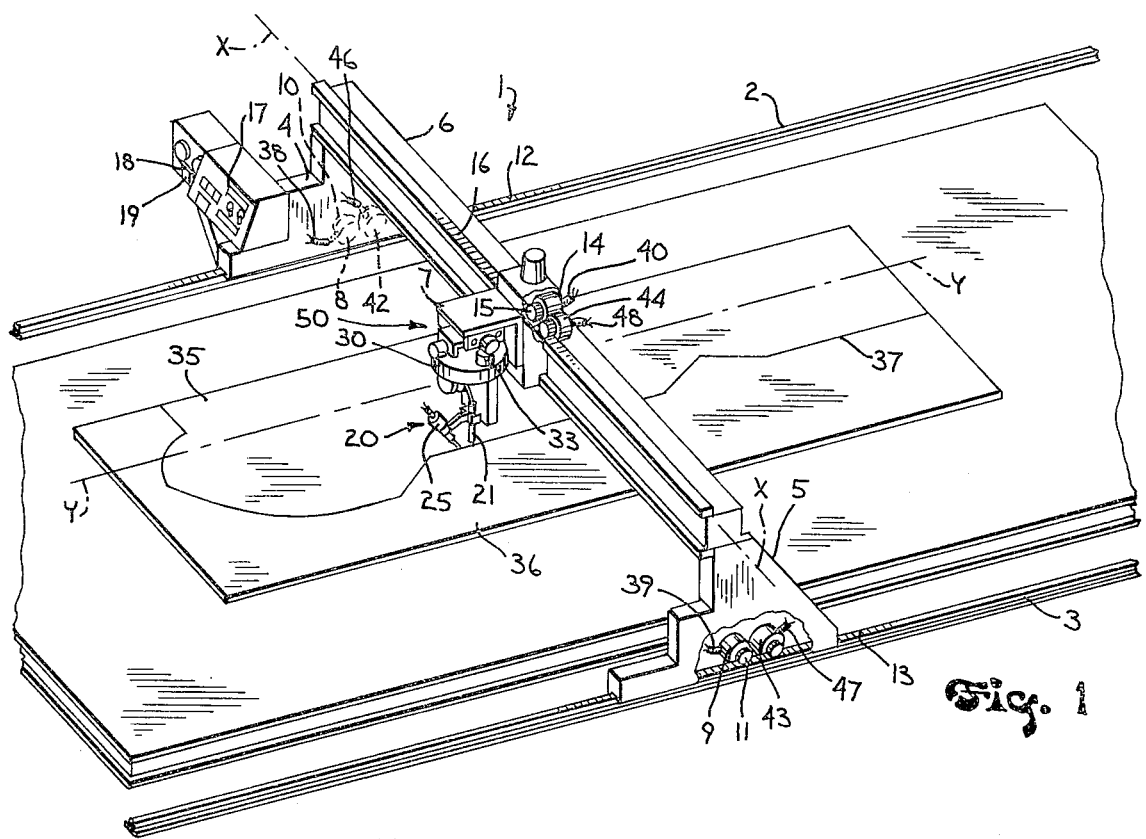
FIG. 1 is a perspective schematic view of a welding machine incorporating the concepts of the invention.
FIG. 2 is an enlarged fragmentary front elevation showing the machine carriage, with parts broken away and in section.

The preferred embodiment incorporating the concepts of the invention is illustrated generally in FIGS. 1-3 wherein a welding machine 1 is adapted to be mounted on a pair of longitudinal parallel rails 2 and 3 which are secured to the floor. Support gantries 4 and 5 are mounted for movement along the respective rails, with the gantries supporting the ends of a transverse support or bridge 6 which extends over the welding area. A carriage 7 is suitably mounted for movement along bridge 6.

Bridge 6 defines a main horizontal X axis, while rails 2 and 3 are parallel to a main horizontal Y axis, for purposes of reference.

Bridge 6 is adapted to be driven in the Y axis direction by any suitable motive mens, such as motors 8 and 9 which are mounted in gantries 4 and 5 and which have respective pinions 10 and 11 which mesh with respective racks 12 and 13 disposed along rails 2 and 3. Similarly, carriage 7 is adapted to be driven along bridge 6 in the X axis direction by any suitable motive means such as a motor 14 on the carriage and which has a pinion 15 which meshes with a rack 16 disposed on the bridge.

A programming device is provided to control the operation of motors 8, 9 and 14, as well as other elements to be described. Such programming device is partially for the purpose of driving carriage 7 and its associated welding head, to be described, along a desired path relative to the X and/or Y axes. The device may be of any desired well-known type, several of which are shown in the above-identified U.S. patents. The device, for example, may comprise a tracer which follows a template contour and drives the machine in a manner to reproduce the contour.

With the advent of numerical control equipment, it is believed that this is now the preferred programming system. As shown schematically in FIG. 1, an input control unit 17 is used to program and operate the numerical control equipment, which includes paper or magnetic tape 18 which passes through the usual pickup head section 19 to create an output for driving the aforesaid motors at a speed and in the direction desired to create a programmed path for the carriage.

Referring to FIGS. 1-3, carriage 7 is adapted to mount a welding assembly 20 which includes a vertical weld head 21 having a tip 22 and which may, for example, be supplied with welding wire 23 from a reel 24. Assembly 20 also includes a sensor which in this embodiment comprises a metallic probe 25 having a tip 26 and which is angularly mounted to head 21, as by a bracket 27. In the present embodiment, weld head 21 and probe 25 are fixedly suspended by brackets 28 from a rotator assembly 29 which is adapted to be rotated about a vertical axis generally perpendicular to axes X and Y and defined herein as the C axis.

Referring to FIGS. 2-4, rotator assembly 29 is suspended beneath carriage assembly 7, in a manner to be described, and includes a fixed housing 39 and a gear 31 having teeth 32, and which is rotatable about the said C axis. The rotational drive for gear 31 comprises, in the present embodiment, a motive means such as motor 33 which is fixedly supported on housing 30, and which has an output shaft gear 34 which meshes with teeth 32 of gear 31. Motor 33 is also connected to the programming device which causes the motor to be properly driven and thereby turn rotator gear 31.

As shown in FIGS. 1-3, weld head 21 and probe 25 are positioned with their tips 22 and 26 in a generally horizontal plane. They are, of course, adapted to work together to join two metal workpieces 35 and 36 which have possibly been tacked together, but which in any event have been fixedly mounted in a generally horizontal stationary position beneath bridge 6. Workpieces 35 and 36 are positioned to form a seam or groove 37 therebetween for receiving welding material, such as wire 23, during the process of forming the weldment. During this process, it is desired that probe tip 26 preceeds weld head tip 22 along the groove so that it may properly act as a sensor of the groove position prior to tip 22 arriving at the same location. Thus, tips 22 and 26 are spaced apart, with axis C passing approximately midway therebetwen. See FIG. 3. In some instances, the C axis may preferably pass other than midway between tips 22 and 26, including passing through one of the tips themselves.

Motors 8, 9, 14 and 33 are connected to the N/C control unit 17 through lines 38-41 respectively so that the programmed signals are caused to drive the motors in the usual well-known manner.

The numerical control is programmed to cause weld head 21 to transverse the general path of groove 37, both straight line or curved. This is the programmed path. In the case of a straight line parallel to one of the main axes X or Y, the numerical control not only moves the respective bridge 6 or carriage assembly 7 only along that axis, but also rotates rotator gear 31 into a fixed position so that weld head tip 22 and probe tip 26 are parallel to the path and that axis, with tip 26 leading. If the groove and programmed path are an angular straight line including components of both X and Y, the program causes both bridge 6 and carriage assembly 7 to move, and also turns ring gear 31 to a fixed position so that tips 22 and 26 are disposed parallel to the angular groove. If, however, groove 37 and the programmed path are curved, the program will not only move both bridge 6 and carriage assembly 7, but will cause gear 31 to continuously rotate to maintain tips 22 and 26 in a constantly shifting line which tends to follow the tangent to the curve at any point.

As is usually the case with numerical controls and the like, a feedback mechanism is provided between the machine and the circuitry within N/C control unit 17 to signal the control that weld head tip 22 and probe tip 26 are where they should be at any given moment, according to the program. See FIGS. 1-4 which show feedback devices 42-45, which may constitute a resolver, a syncro receiver, a pulse encoder or the like, connected with racks 12, 13 and 16, as well as ring gear 31. The relative positional information which is sensed by devices 42-45 is fed back to numerical control unit 17 through respective lines 46-49.

As previously pointed out, to merely drive head 21 along groove 37 in accordance with the program may not produce welds of the highest quality. This is because the pieces from which the weldment is to be made may have been flame cut, so that the edge tolerances are rather large.

The present welding machine is constructed so as to sense deviations of the groove from the programmed path and to override the program to move the weld head to a corrected welding position when necessary, all without upsetting or changing the basic program.

For this purpose, probe 25 is connected to mechanism that, independently of the main program, causes welding assembly 20 and its rotator assembly 29 to traverse a correction course.

As best shown in the embodment of FIGS. 1-4, a slide assembly 50 is disposed between carriage 7 and rotator assembly 29. Slide assembly 50 comprises an upper $X_d$ slide section suspended from carriage 7 as by a bracket 51 mounting a threaded lead screw or shaft 52. Shaft 52 extends parallel to bridge 6 and the machines main X axis, and is used to define groove deviations perpendicular to the main Y axis. Thus, its axis will be called the $X_d$ axis. A pair of guide rods 53 extend parallel to threaded shaft 52 and, together with the latter, mount a block 54 which is threaded on the shaft. Assembly 50 includes a lower $Y_d$ slide section which is disposed at right angles from the upper slide section and which includes a bracket 55 mounting a threaded lead screw or shaft 56. Shaft 56 extends parallel to rails 2 and 3 and to the machine's main Y axis, and is used to define groove deviations perpendicular to the main Y axis. Thus, its axis will be called the $Y_d$ axis. Rods 57 extend parallel to shaft 56 and mount a block 58 which is threaded on shaft 56 and from which rotator assembly housing 30 is suspended.

Motive means are provided to cause shaft 52 to turn to thereby drive block 54 and everything suspended from it, including weld head 21 and probe 25, along the $X_d$ axis. For this purpose, a motor 59 is mounted on bracket 51 with its output connected to rotate shaft 52. Similarly, and as to the $V_d$ axis, a motor 60 is mounted on bracket 55 with its output connected to rotate shaft 56.

Motors 59 and 60 are adapted to be driven independently or together in accordance with deviations in groove 37 from the programmed path which are sensed by probe 25 as the welding operation progresses. For this purpose, the motors and probe are electromechanically connected by a resolver 61 which is fixedly mounted on rotator housing 30. Resolver 61 has the usual rotatable shaft 62 which extends downwardly, with its lower end having a gear 63 which meshes with rotator gear 31. It is important that resolver shaft 62 and rotator gear 31 rotate on a one-to-one ratio. That is, for every rotation of 360° of gear 31, shaft 62 also rotates 360°. To accomplish this, a gear box 64 may be positioned between resolver 61 and gear 31, with gear 63 being mounted on the gear box output.

Resolver 61 is of the well-known sine-cosine syncro type having a single phase rotor and a two phase stator. The indexed position of resolver shaft 62 is utilized to create an electrical output which is divided into $X_d$ and $Y_d$ coordinate voltage signals to drive motors 59 and 60.

Figure 5:
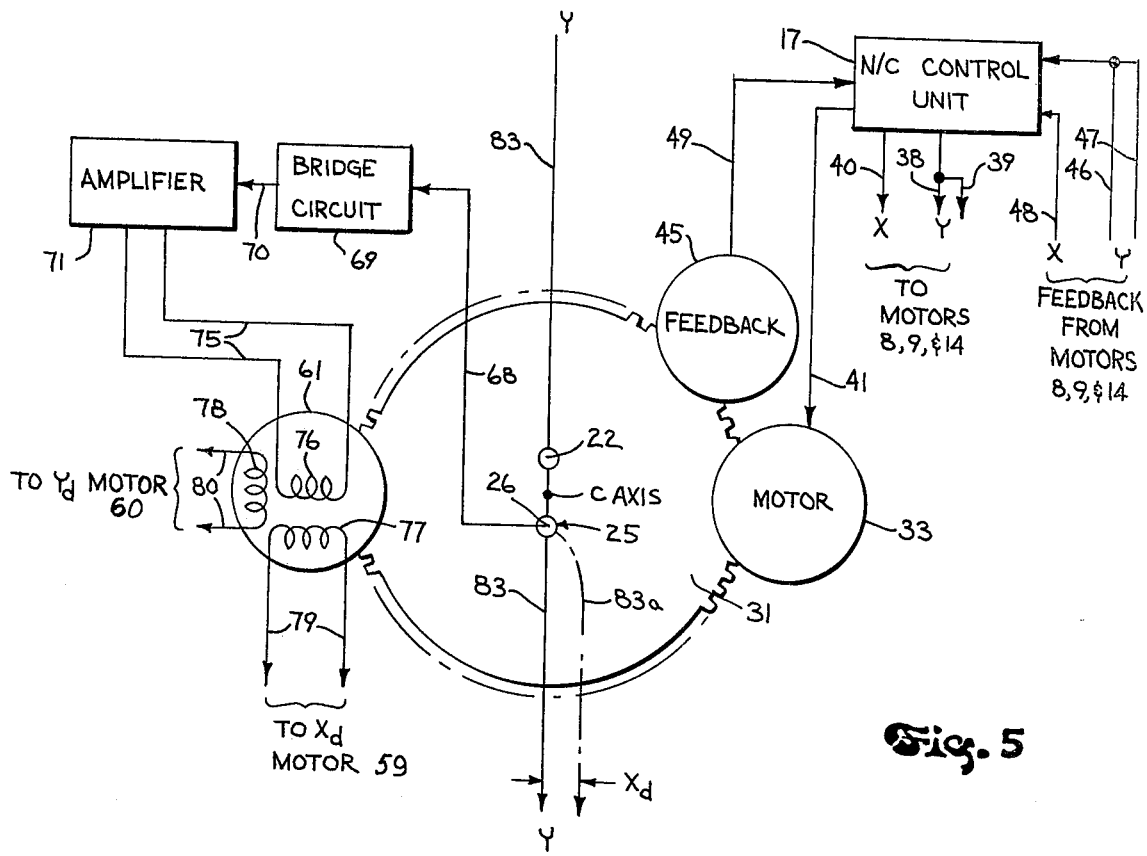
FIG. 5 is an electromechanical showing of the system for detecting and correcting for deviations when the seam to be welded is parallel to the Y axis of the machine.
Figure 9:
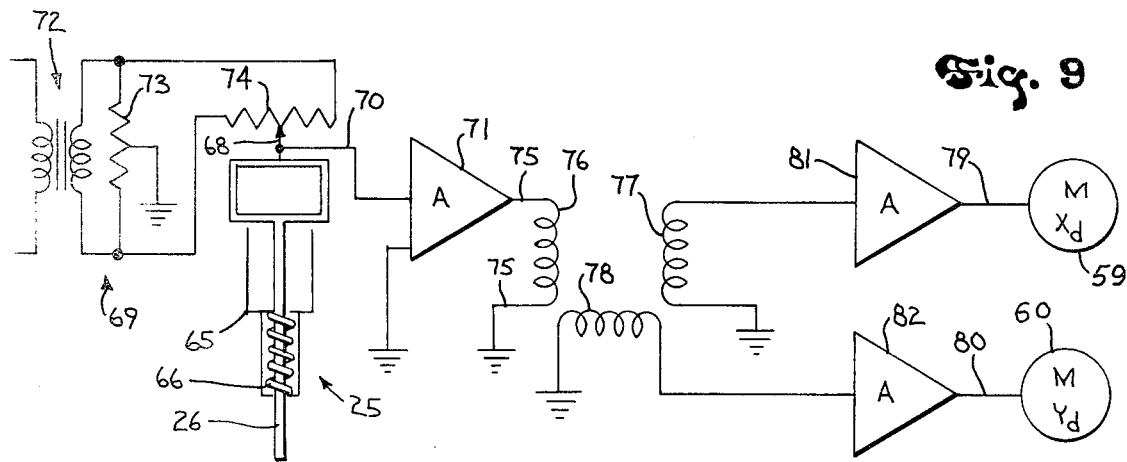
FIG. 9 is a schematic electrical circuit diagram of the detecting and correcting system.

Referring to FIGS. 5 and 9, probe 25 is provided with a housing 65 into which tip 26 extends, with the latter being biased toward central position, as by a spring 66. The biased position of tip 26 is such that the probe output 67 feeds through a line 68 to a bridge circuit 69 which in turn is connected through a line 70 to a null-type amplifier 71. Bridge circuit 69 includes a power supply transformer 72 and a pair of variable resistors 73 and 74 connected in parallel. When the variable resistors are in normal balance, no signal is fed to amplifier 71. However, if a deviation occurs in groove 37, probe 25, which contains resistor 74, will cause the resistors, and thus the bridge circuit, to become unbalanced, thereby causing a signal to be fed to amplifier 71.

Amplifier 71 is connected to feed through lines 75 to the rotor winding 76 of shaft 62 of sine cosine resolver 61. The respective $X_d$ and $Y_d$ stator windings 77 and 78 of resolver 61 are positioned at 90° to each other and are connected through lines 79 and 80 to $X_d$ motor 59 and $Y_d$ motor 60. If desired, suitable servo amplifiers 81 and 82 may be inserted in the respective lines 79 and 80.

FIGS. 5-8 of the drawings schematically illustrate the operation of the device of the invention throughout a series of different weld groove arrangements, all of which are also shown on the workpiece of FIG. 1.

Turning first to FIG. 5, the numerical control unit 17 has been programmed to weld a seam in a groove which is generally parallel to the main Y axis of the machine. The programmed path, shown in full line representation is designated at 83, is exactly parallel to the Y axis and extends generally along groove 37. Unit 17 first causes motor 33 to turn rotator gear 31 about the C axis so that probe tip 26, the C axis and weld head tip 22 are in a line also parallel to the Y axis, with probe tip 26 leading. This information is fed back to the control unit 17 via feedback device 45. Turning of rotator gear 31 also causes resolver shaft 62 to turn so that rotor winding 76 is facing and parallel to stator winding 77, and at 90° to stator winding 78. This is a resolver fixed preset. However, at least at the beginning, probe tip 26 is positioned exactly in accordance with the program so that bridge 69 is balanced and amplifier 71 has no output voltage signal. Therefore, resolver 61 has no electrical output to slide motors 59 and 60. Unit 17 then causes bridge 6 to move along the Y axis, via motors 8 nd 9, with no movement of carriage 7. This information is also fed back to control unit 17 via feedback devices 42 and 43. This satisfies the control unit that the programmed path 83 is being followed.

However, the actual groove 37 may not extend exactly in accordance with the programmed path 83, as heretofore explained. As carriage 7 and welding assembly 20 are driven along the programmed path, probe tip 26 which follows the groove will sense deviations of the groove from the programmed path. These deviations cause tip 26 to move perpendicular to path 83 and the Y axis, and therefore parallel to the X axis. The deviated groove is illustrated in FIG. 5 as a phantom line 83a and defines an $X_d$ error which must be corrected in order for the groove to be properly welded.

The previously described structure is such that when probe tip 26 follows the deviated groove, it causes bridge circuit 69 to become unbalanced, which in turn causes null amplifier 71 to feed a voltage signal to resolver rotor winding 76 which is proportional to the amount of deviation. The preset position of winding 76 is such that a voltage signal is induced in stator winding 77 for $X_d$ slide motor 59, but no signal will be induced in stator winding 78 for $Y_d$ slide motor 60. Thus, only motor 59 will be activated to turn its associated shaft 52. This causes rotator assembly 29, weld head 21, probe 25 and the C axis to move along the $X_d$ axis by the amount of the deviation. Weld head tip 22 therefor is shifted away from programmed path 83 and to the deviated or actual and desired path 83a.

Because there is no feedback from the correction mechanism to control unit 17, the program remains satisfied, even though it has been overridden.

Deviations in the groove are continuously sensed by probe tip 26 as it is driven along the groove, and corrections are continuously made.

Figure 6:
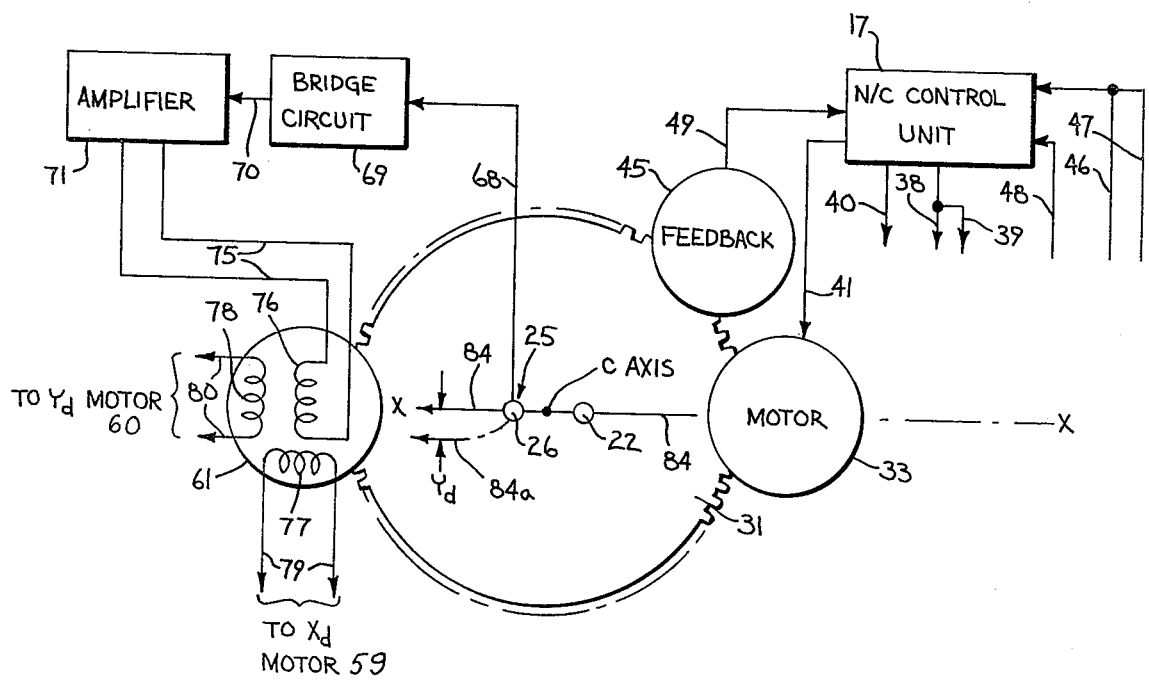
FIG. 6 is a showing similar to FIG. 5 when the seam to be welded is parallel to the X axis of the machine.

The illustration of FIG. 6 is generally similar to that of FIG. 5, except in this instance control unit 17 is programmed to weld a seam in a groove which is generally parallel to the main X axis of the machine. The programmed path is shown as 84. Unit 17 causes motor 33 to turn rotator gear 31 about the C axis so that tips 22 and 26 and the C axis are now in a line parallel to the X axis. Resolver shaft 62 is thusly turned on command from unit 17 to a fixed preset position so that rotor winding 76 faces stator winding 78 and is positioned 90° to stator winding 77. Control unit 17 causes carriage 7 to move along the X axis, with no movement of bridge 6.

Deviations 84a in the groove from the programmed path 84 are sensed by probe tip 26 which is caused to move perpendicular to path 84, unbalancing bridge circuit 69 and causing amplifier 71 to feed a voltage signal to rotor winding 76. This induces a voltage in stator winding 78 to cause only $Y_d$ slide motor 60 to operate and more rotator assembly and its associated parts, including weld head 21, along the $Y_d$ axis by the amount of the deviation.

Figure 7:
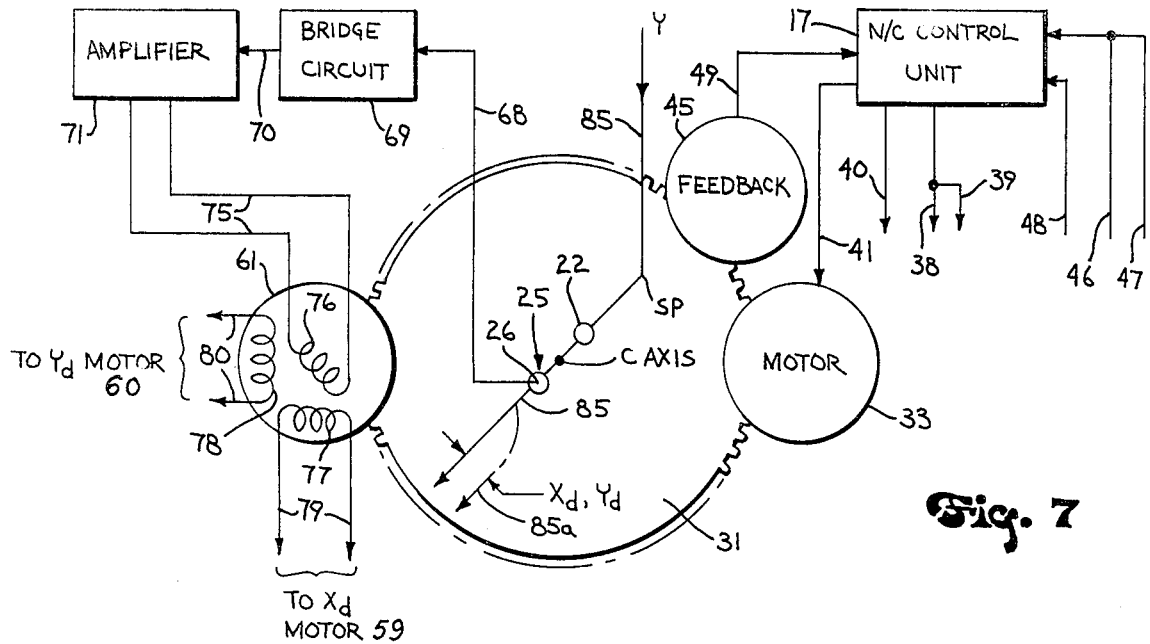
FIG. 7 is a showing similar to FIGS. 5 and 6 when the seam to be welded is a straight line extending at an angle to both the X and Y axes of the machine.

In the illustration of FIG. 7, the groove to be welded starts out as in FIG. 5, that is, parallel to the Y axis, and then shifts to a generally straight line at an angle to both the X and Y axes. The programmed path, which generally follows the groove, is designated at 85, with the shift point designated as SP.

When the vertical portion of path 85 is being traversed, the device functions as described in connection with FIG. 5. However, when shift point SP is reached, control unit 17 is programed to turn rotator gear 31 so that resolver rotor winding 76 is newly fixedly preset angularly relative to both stator windings 77 and 78. Tips 22 and 26 and axis C now are positioned in a line at an angle corresponding to the lower portion of programmed path 85. The program now drives bridge 6 and carriage 7 together.

Figure 8:
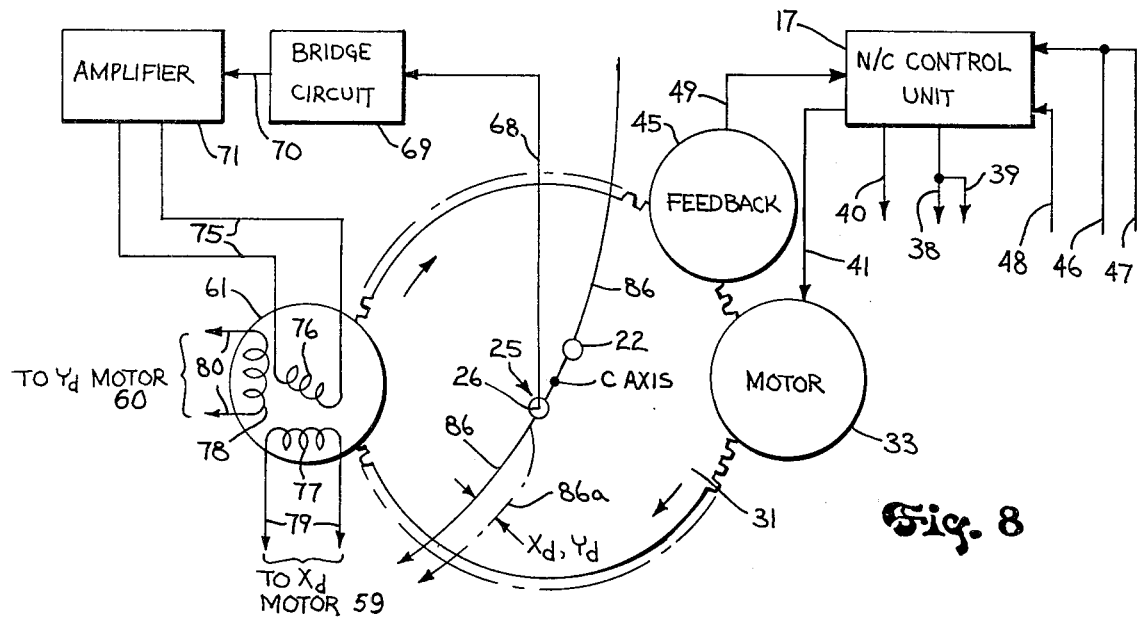
FIG. 8 is a showing similar to FIGS. 5-7 when the seam to be welded is curved.

When probe tip 26 senses a deviation in the angled groove, designated as 85a in FIG. 7, it again moves perpendicular to path 85 and unbalances bridge circuit 69 so that null amplifier 71 feeds a voltage signal to resolver rotor winding 76. However, because winding 76 is now positioned angularly relative to both stator windings 77 and 78, a voltage will be induced in both of the latter, causing both $Y_d$ slide motor 60 and $X_d$ motor 59 to operate proportional to the relative winding angularity, so that rotator assembly 29 and its associated parts, including weld head 21, are moved relative to both $Y_d$ and $X_d$ axes, as dictated by the amount of the deviation.

when a curved groove is to be welded, the programmed path will take a form such as is shown at 86 in FIG. 8. In view of the continuous change in direction of path 86, and since tips 22 and 26 as well as the C axis are to be maintained in a straight line which as closely as possible follows path 86, rotator motor 33 is programmed to create a continuous rotation of gear 31 and thus resolver shaft 62. This causes a continuously varying angular relationship between resolver rotor winding 76 and the stator windings 77 and 78. The groove deviation 86a sensed by probe tip 26 moving substantially perpendicular to a tangent to the curve therefore causes a continuously varying drive of $Y_d$ slide motor 60 and $X_d$ slide motor 59.

Because rotator gear 31 and resolver shaft 62 are connected to turn in a one-to-one relationship, and in view of the usual rotatable electrical connectors (not shown) between the rotatable parts, a full 360° of rotative positioning and deviation correction is provided for.

The device of the invention does have a slight limitation as to accuracy of the correction provided for non-linear paths. The limitation is caused by the fact that weld head tip 22 and probe tip 26 are not placed directly on the C axis of rotator rotation. Instead, they are spaced slightly away from the axis and from each other, in view of the fact that the probe preferably leads the weld head by a slight amount. However, the spacing between tips 22 and 26 needs to be only a short distance, such as 1". Furthermore, when welding large weldments of the type contemplated here, most curvatures will have a minimum radius of about 3". The difference between the curvature and the tangential line extending between tips 22 and 26 will therefore be substantially de minimus.

A further limitation due to the spacing between tips 22 and 26 arises in attempts to traverse 90° corners. In such instances, it may be necessary to stop the machine program and manually traverse the corner, or to program the machine to make a 270° loop with the arc off.

In the embodiment described and illustrated herein, a flat workpiece disposed in a single plane is being welded. The plane inclues only two axes, X and Y. In some instances, it may be desirable to use the concepts of the invention in welding a workpiece wherein the weld groove has a vertical, or Z, component as well. This may easily be added to the control program. Furthermore, slide assembly 50 may be provided with a third slide representing the $Z_d$ axis, resolver 61 may have a third stator winding connected to a $Z_d$ axis motor, and probe 25 may be constructed to sense vertical deviations as well as horizontal.

The axes shown and described, their designations and positions, are for illustrative and convenience purposes only. Other systems of plural axes may be utilized without departing from the spirit of the invention.

The concepts of the invention may be utilized in welding machines using many different systems, such as MIG, TIG or submerged arc. In a machine of the type illustrated, the particular welding system may be changed by changing the welding head and its associated supply mechanisms without the need for changing or modifying the basic deviation correction system.

The concepts of the invention make it possible to use a single program for welding a plurality of substantially similar workpieces, and to recognize the dimensional uniqueness of each piece by continuously sensing the deviations from the program and continuously adjusting or correcting for such deviations, all without having to change the program. There is no need to put the deviations into a program memory or the like for subsequent use, because the correcting device is responsive to each individual workpiece as it is being welded, and independent of the program. The device automatically compensates for the difference between the programmed path and the desired actual path.

When it is desired to weld parts of different shape in succession, all that need be done is to change the program of the control unit. The sensing and correction device may remain the same.

Various modes of carrying out the invention are contemplated as being within the scope of the following claims particularly pointing out and distinctly claiming the subject matter which is regarded as the invention.

I claim:

1. In a welding machine for joining a plurality of stationary metal pieces along a groove formed therebetween:
   (a) a machine support mounted for movement along a Y axis,
   (b) a machine carriage mounted to said support for movement along an X axis,
   (c) a rotator suspended beneath said carriage and with said rotator being rotatable about a C axis disposed generally perpendicular to the said X and Y axes,
   (d) a weld head suspended beneath said carriage for forming a weld in said groove,
   (e) a sensor suspended beneath said carriage for following the contour of said groove in advance of said weld head,
   (f) said weld head and said sensor being spaced from each other and said C axis on a straight line extending through said C axis and being rotatable together with said rotator about said C axis,
   (g) first and second motive means:
      (1) to selectively drive said support and said carriage along their respective axes, and
      (2) to rotate said rotator about said C axis,
   (h) said first and second motive means being actuatable in response to an input control unit to cause said sensor and weld head to traverse a programmed path generally corresponding to that of said groove,
   (i) and program override means connected to said rotator and responsive to a deviation in said groove perpendicular to the said programmed path and sensed by said sensor to cause said rotator and said weld head to move from said programmed path to a corrected path which is in correspondence with the actual path formed by said groove.

2. The welding machine of claim 1 wherein said program override means provides a continuous corrective adjustment of said weld head independent of said input control unit as said groove is traversed by said sensor.

3. The welding machine of claim 1 wherein said program override means includes:
   (a) a slide assembly suspended from said carriage and having a plurality of slides movable in directions defining axes of deviation,
   (b) and third motive means for selectively driving said slides along said axes of deviation,
   (c) said slide assembly being connected to said rotator so that actuation of said third motive means causes said rotator to selectively move relative to said axes of deviation.

4. The welding machine of claim 3 wherein said program override means includes:
   (a) electromechanical means having an electrical input connected to said sensor and an electrical output connected to said third motive means,
   (b) said electromechanical means being mechanically settable in accordance with the rotary position of said rotator as determined by said second motive means.

5. The welding machine of claim 4 wherein said electromechanical means comprises: a sine cosine resolver having a rotatable shaft connected for rotation with said rotator, and having a rotor input winding and stator output windings.

6. The welding machine of claim 5 wherein said resolver shaft and said rotator are connected for rotation in a one-to-one ratio.

7. The welding machine of claim 5 or 6 wherein said resolver shaft and said rotator are connected for rotation about 360°.

8. The welding machine of claim 5 wherein the connection between said sensor and said electromechanical means comprises means to selectively apply an electric signal to said rotor input winding in accordance with the deviation sensed by said sensor to activate said stator output windings and thereby actuate said third motive means to move said slides on said axes of deviation.

9. The welding machine of claim 3, 4, 5 or 8 wherein:
 (a) said slide assembly is mounted to said carriage,
 (b) said rotator is mounted to the lowermost slide of said plurality of slides,
 (c) and said weld head and sensor are mounted to the underside of said rotator.

10. The welding machine of claim 2 or 3 which includes positional feedback means extending from said support, carriage and rotator to said input control unit.

11. The welding machine of claim 5 wherein, when said groove defines a straight line, said resolver shaft is set in a fixed position during traverse of the groove.

12. The welding machine of claim 5 or 11 wherein, when said groove defines a curved line, said resolver shaft continuously rotates during traverse of the groove.

* * * * *

UNITED STATES PATENT AND TRADEMARK OFFICE
CERTIFICATE OF CORRECTION

PATENT NO. : 4,255,643   Page 1 of 2
DATED : March 10, 1981
INVENTOR(S) : FREDRICK J. BALFANZ It is certified that error appears in the above-identified patent and that said Letters Patent are hereby corrected as shown below:

Column 1, Line 61    Delete "actors" and substitute therefor ----factors----

Column 2, Line 39    Delete "rotor" and substitute therefor ----rotator----

Column 2, Line 55    Delete "dericted" and substitute therefor ----directed----

Column 3, Line 15    Delete "settling" and substitute therefor ----setting----

Column 4, Line 18    Delete "mens" and substitute therefor ----means----

Column 4, Line 62    Delete "39" and substitute therefor ----30----

Column 5, Line 18    Delete "therebetwen" and substitute therefor ----therebetween----

Column 5, Line 27    Delete "transverse" and substitute therefor ----traverse----

UNITED STATES PATENT AND TRADEMARK OFFICE
CERTIFICATE OF CORRECTION

PATENT NO. : 4,255,643
DATED : March 10, 1981
INVENTOR(S) : FREDRICK J. BALFANZ

It is certified that error appears in the above–identified patent and that said Letters Patent are hereby corrected as shown below:

| | |
|---|---|
| Column 6, Line 5 | Delete "embodment" and substitute therefor ----embodiment---- |
| Column 6, Line 21 | Delete "Y" and substitute therefor----X---- |
| Column 6, Line 31 | Delete "$V_d$" and substitute therefor ----$Y_d$---- |
| Column 8, Line 20 | Delete "more" and substitute therefor ----move---- |
| Column 9, Line 26 | Delete "inclues" and substitute therefor ----includes---- |

Signed and Sealed this

Sixteenth Day of June 1981

[SEAL]

Attest:

RENE D. TEGTMEYER

Attesting Officer     Acting Commissioner of Patents and Trademarks